Patented Oct. 12, 1926.

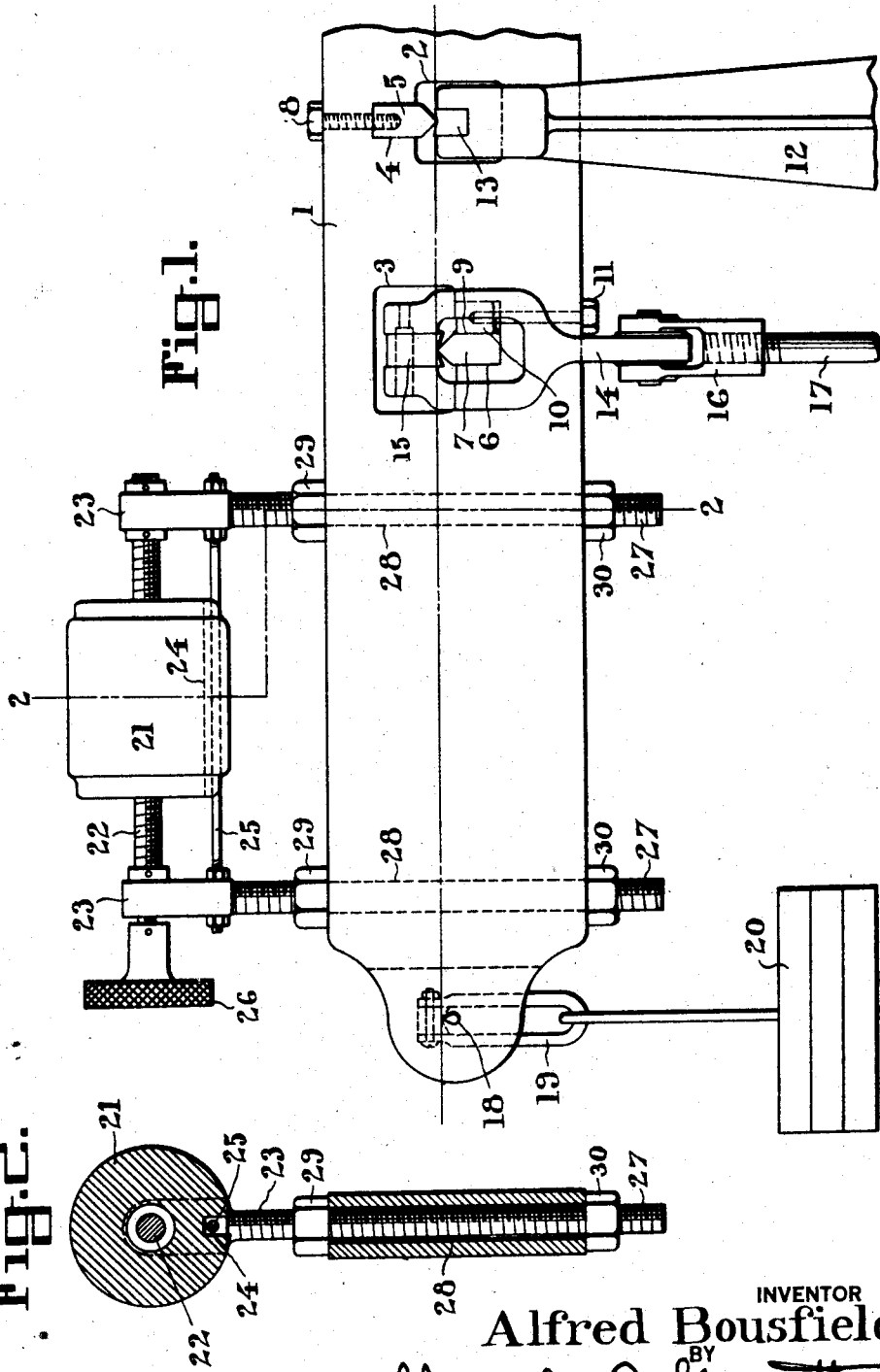

1,603,021

UNITED STATES PATENT OFFICE.

ALFRED BOUSFIELD, OF ST. JOHNSBURY, VERMONT, ASSIGNOR TO E. AND T. FAIRBANKS COMPANY, OF ST. JOHNSBURY, VERMONT, A CORPORATION OF VERMONT.

BALANCE BALL.

Application filed December 28, 1925. Serial No. 77,925.

This invention relates to scales, and more particularly to an adjustable balance ball for use on weigh-beams ordinarily employed in connection with high capacity scales.

It is an object of the invention to provide an improved balancing device of the class mentioned which is relatively simple in construction, and reliable and exact in function under all conditions of service.

Another object is the provision of an improved adjusting mechanism for the balance ball, with which mechanism is incorporated means for permitting both the vertical and longitudinal adjustment of the balance ball in order to shift the center of gravity of the beam.

Other objects will be in part obvious in connection with the following detailed description of an illustrative embodiment of the invention and in part pointed out hereinafter.

The invention accordingly consists of the features of construction, combination of elements, and arrangement of parts, which will be exemplified in the construction hereinafter set forth, and the scope of the application of which will be indicated in the appended claim.

For a complete understanding of the nature of the invention reference should be had to the accompanying drawings wherein:—

Figure 1 is a side view of a portion of a weigh-beam, showing the application of my invention thereto, and Figure 2 is a vertical transverse section taken on the line 2—2 of Fig. 1.

Referring now to the drawings, the weigh-beam comprises a bar 1 provided with a pair of spaced rectangularly shaped openings 2 and 3. The openings are located near one end of the beam, and the opening 2 has a notch 4 cut into its upper edge for the reception of a knife edge pivot 5, while the opening 3 has a notch 6 cut into its lower edge for the reception of a knife edge pivot 7. Both pivots are disposed transversely of the beam and the ends of the pivots project from each side of the beam for a purpose to be hereinafter more fully described. The pivot 5 is detachably secured to the beam by means of a screw 8, passed downwardly through the beam. As shown, one face of the pivot 7 is tapered, or inclined, as indicated by the numeral 9.

A block 10, having a face inclined to correspond with the inclined face of the pivot, is inserted in the notch 6, being retained in position by a screw 11, passed upwardly through the beam. When the screw 11 is turned up tight, the block 10 will function as a wedge and hence will clamp the pivot in position and prevent any rocking thereof.

For the purpose of supporting the beam so that it can swing in a vertical path, use is made of a stand 12, only the upper part of which is shown. However, it is to be understood that the stand can be mounted on any suitable base. The top of the stand straddles the beam in the usual well known manner, and is provided with concaved bearings 13 on which the projecting ends of the pivot 5 seat.

Suspended from the pivot 7 is a loop 14 having a bearing block 15 mounted in its top for engaging with the knife edge of the pivot. The lower end of the loop 14 carries a yoke 16 into which is threaded the upper end of a load transmitting rod 17. In this manner the beam can be connected to the lever system of the scale (not shown.)

The rear or butt end of the beam is provided with a pivot 18 carrying a loop 19 from which is suspended a counter poise 20.

Means for completing the precise balancing of the beam in zero or no load position is provided by a balance ball 21.

For the purpose of enabling the ball to be moved longitudinally, a rod 22, threaded through the ball, is rotatably mounted in the upper ends of a pair of standards 23, spaced from each end of the ball. The ball has a peripheral groove 24 formed longitudinally thereof. Connecting the standards and positioned within the groove 24, is a rod 25 which serves as means for restraining the ball from rotating about the rod 22. The rod 22 is provided at its outer end with an operating hand wheel 26.

In order that the ball may be vertically shifted with respect to the beam, the standards 23 are formed with threaded shanks 27 which are passed downwardly through openings 28 formed in the beam. Nuts 29 are mounted on the shanks to bear against the upper edge of the beam, while nuts 30 are mounted on the lower ends of the shanks to be against the bottom of the beam.

By this construction, the balance ball can be shifted both longitudinally and vertically to adjust the center of gravity of the beam relatively to its supports. The preliminary adjustment is accomplished by raising or lowering the standards 23 carrying the ball, by turning the nuts 29 and 30 up or down, and the final adjustment being obtained by manipulating the hand wheel 26 to move the ball longitudinally of its support.

Thus among others, the objects aforementioned are accomplished, and it will be perceived that the mechanisms may be rearranged and modified according to the most desirable practice.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claim is intended to cover all of the generic and specific features of the invention herein described, and all statements of the scope of the invention which, as a matter of language might be said to fall therebetween.

Having described my invention, what I claim is:—

The combination with a weigh-beam having a pair of spaced apart vertical openings formed therein near one end thereof, of a pair of standards mounted in said openings, a threaded rod carried by the tops of the standards and extending horizontally therebetween, a balance ball mounted on said threaded rod, said ball having a peripheral groove formed longitudinally thereof, a second rod carried by the standards below the threaded rod, said second rod being disposed in the said groove of the balance ball, means for moving the balance ball longitudinally of the said threaded rod and means for vertically adjusting the height of the balance ball with respect of the weigh-beam.

In testimony whereof I hereunto sign my name.

ALFRED BOUSFIELD.